United States Patent [19]

Jatko et al.

[11] Patent Number: 4,737,657
[45] Date of Patent: Apr. 12, 1988

[54] INTERROGATOR SYSTEM FOR IDENTIFYING ELECTRICAL CIRCUITS

[76] Inventors: William B. Jatko, 10601 Rivermist La., Knoxville, Tenn. 37922; David R. McNeilly, Rte. 12, Box 538, Maryville, Tenn. 37801

[21] Appl. No.: 884,102

[22] Filed: Jul. 10, 1986

[51] Int. Cl.$^4$ .............. H02J 1/00; H04M 11/04; G08C 19/16
[52] U.S. Cl. .............................. 307/85; 364/480; 340/310 A; 340/310 R
[58] Field of Search .................. 307/85–87; 364/480–483; 340/870.11, 870.15, 870.18, 310 A, 870.19, 310 R

[56] References Cited

U.S. PATENT DOCUMENTS 3,786,423 1/1974 Martell ........................... 340/870.19
4,476,535 10/1984 Loshing et al. ..................... 364/480
4,652,855 3/1987 Weikel .............................. 340/310 A Primary Examiner—William M. Shoop, Jr.
Assistant Examiner—Sharon D. Logan
Attorney, Agent, or Firm—Pitts and Brittian

[57] ABSTRACT

A system for interrogating electrical leads to correctly ascertain the identity of equipment attached to remote ends of the leads. The system includes a source of a carrier signal generated in a controller/receiver to be sent over the leads and an identifier unit at the equipment. The identifier is activated by command of the carrier and uses a portion of the carrier to produce a supply voltage. Each identifier is uniquely programmed for a specific piece of equipment, and causes the impedance of the circuit to be modified whereby the carrier signal is modulated according to that program. The modulation can be amplitude, frequency or phase modulation. A demodulator in the controller/receiver analyzes the modulated carrier signal, and if a verified signal is recognized displays and/or records the information. This information can be utilized in a computer system to prepare a wiring diagram of the electrical equipment attached to specific leads. Specific circuit values are given for amplitude modulation, and the system is particularly described for use with thermocouples.

20 Claims, 5 Drawing Sheets

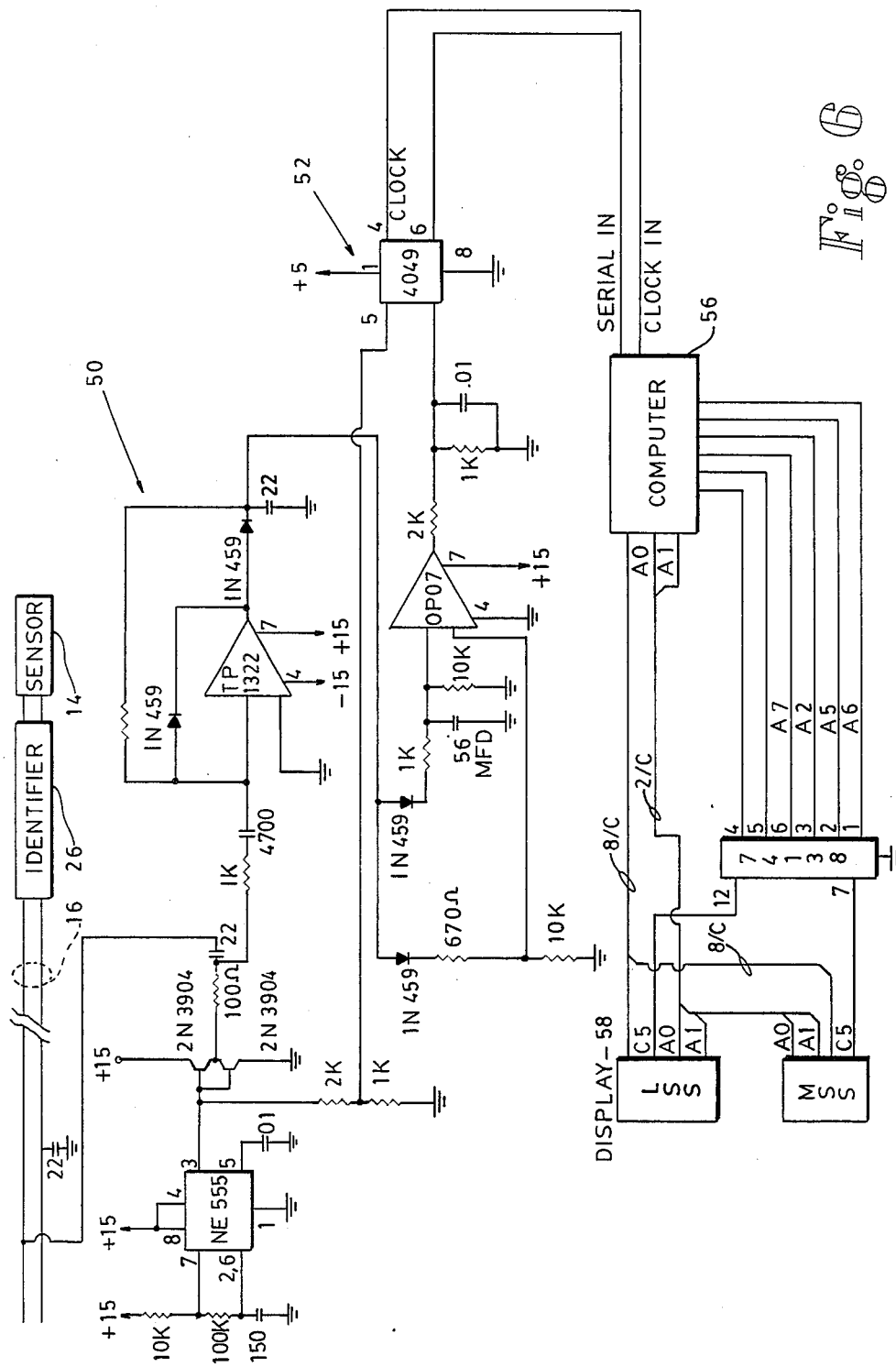

& # 35; INTERROGATOR SYSTEM FOR IDENTIFYING ELECTRICAL CIRCUITS

BACKGROUND OF THE INVENTION

This invention was developed at least in part under Contract Number W-7405-Eng-26 with the U.S. Department of Energy. The inventors have been granted a Waiver of the DOE rights to the invention.

TECHNICAL FIELD

The present invention relates generally to circuits for assuring proper connection of wires in complex electrical installations, and more particularly to an interrogator system for passively determining the identity of apparatus connected to lead wires in such electrical installations by using the lead wires themselves and uniquely affecting the impedance of those wires for a specific apparatus.

There are numerous facilities wherein extensive electrical installations involve power or signal sources, electrical equipment and lead wires connecting the sources to the equipment. These include such facilities as electrical generating plants, industrial plants and even various transportation vehicles (particularly aircraft). Such facilities often utilize many thousands of interconnected cables (leads) and miles of wires since the load (the equipment connected to the lead wires) and the source are widely separated.

Quality assurance in these complex facilities must be rigid since improperly connected wires could cause misleading information and/or extensive property damage. For example, in a system having many temperature sensors, it is important that an instrument monitoring those sensors correctly displays the temperature of the proper sensor. A considerable problem would exist if the instrument indicates a satisfactory temperature for a sensor in a critical area when, in fact, it is incorrectly monitoring the sensor in an area that is not critical.

Thus, considerable testing must be conducted during and after installation of wires in the complex wiring systems. This can involve many man-years of time, and thus involve extensive costs. It has been estimated that about fifty percent of the cost of instrument installation in complex system is the cost of the quality assurance of the wiring. Even the replacement of sensitive equipment involves a quality assurance check to determine the correct reinstallation of the replacement.

Various interrogation systems have been considered. All of the known systems, however, have add considerable cost to the installation. Some, for example, require separate wires to provide power to an "identifier" circuit at the ends of electrical wires leading to the "load". Other systems adversely affect signals generated in various sensors; and a common problem is the time involved to properly interrogate all lines of a system.

Accordingly, it is a principal object of the present invention to provide a passive means for generating a signal unique to the apparatus at the end of electrical leads without requiring additional leads.

It is another object of the present invention to provide an interrogation system that does not require a remote power source at the end of electrical leads, but rather such system receives power from an interrogation signal carried on those leads.

It is a further object of the present invention to provide an identifier unit to be installed at the end of electrical leads that will produce an output signal that is unique for that identifier unit, and the format of that output signal can be pre-programmed during installation of the equipment.

It is also an object of the present invention to provide an interrogation system that will supply data to enable a computer to generate a wiring diagram upon completion of the wiring of an installation.

These and other objects of the present invention will become clearer upon a consideration of the following drawings and a complete description thereof.

DISCLOSURE OF THE INVENTION

In accordance with the present invention, there is provided a system for interrogating lead wires of an electrical system to determine the specific electrical equipment connected thereto. Each piece of remote electrical equipment is provided with a passive identifier unit which, when energized, delivers on the lead wires an electrical signal that is unique to that piece of equipment. The identifier unit is powered by an interrogator signal delivered over the leads. The unit is designed to uniquely modify the impedance of the leads such that the interrogator signal is modulated (frequency, phase or amplitude) thereby permitting demodulation at the sending end to identify the specific piece of equipment. The identifier unit is pre-programmed during installation of the electrical equipment within the system, or before installation of a new identifier unit in an established circuit. The results of an interrogation of a complete system can be used to plot the wiring diagram of the system.

BRIEF DESCRIPTION OF THE DRAWINGS

FIG. 6 is a schematic diagram of that portion of the present invention as illustrated in FIG. 5.

DETAILED DESCRIPTION OF THE INVENTION

Figure 1:
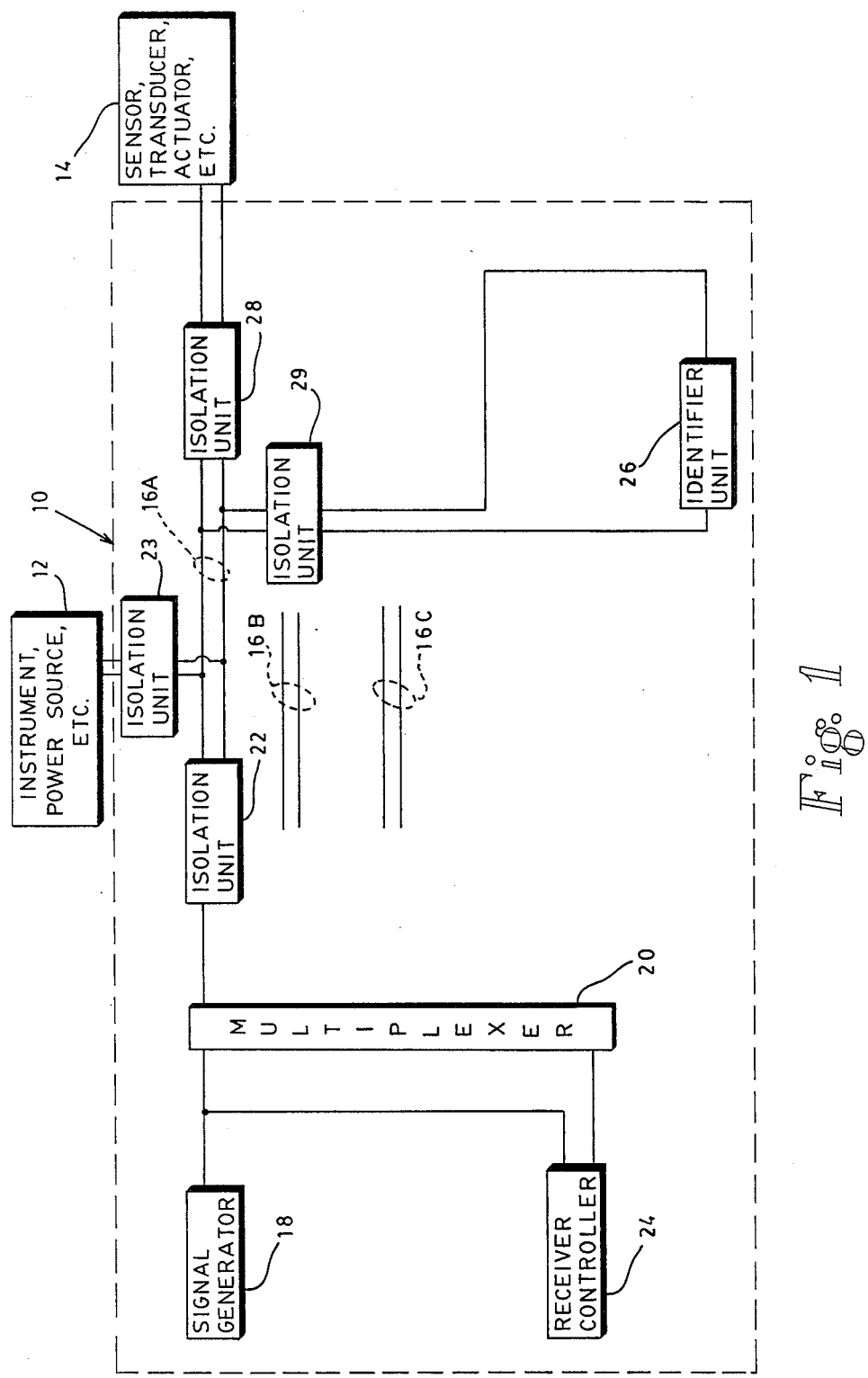
FIG. 1 is a block diagram of an electrical system as incorporating the present invention.

Referring to FIG. 1, shown at 10 therein is a block diagram of the essential components of an interrogator system of the present invention. It is shown as connecting a "source" unit 12 at one location in an electrical system to a "load" unit 14 at the opposite end. Typically, the source unit is connected to the load unit using a pair of leads 16 as indicated at 16A, 16B, 16C. The source unit 12 can be, for example, an instrument to record some type of signal from a sensor at the load 14. Further, this instrument can be connectable through other leads (as at 16B, 16C, etc.) to separate sensors (not shown).

At the source end of leads 16 (A, B, C, etc.) is a signal generator 18 that is connected to a multiplexer unit 20. An isolation unit 22 prevents signals on the leads from feeding back into the signal generator. A second isolation unit 23 prevents an output of the generator 18 from feeding to the source unit 12. The multiplexer 20 provides means for connecting the output of the generator 18 to any selected pair of leads 16. Also in this portion of the circuit of the present invention is a unit 24 identified as a receiver-controller. Details of all these units are given hereinafter.

The "load" end of the circuit of the present invention includes an identifier unit 26 and isolation units 28, 29. The identifier, as described in greater detail hereinafter, utilizes a signal from the signal generator 18 to produce an operating voltage and then to modulate the signal from the generator in a manner that uniquely identifies the particular load 14 connected to the source 12. The isolation unit 28 prevents the passage of the signal from generator 18 to the load 14, and the isolation unit 29 prevents normal signals on leads 16 from feeding into the identifier unit 26.

Although the present invention will have many applications, its use in passive systems will be particularly important. For example, the load 14 is often a sensor of such things as temperature or a sensor monitoring actuation of a particular piece of equipment, such as a valve. It is important to know that the information received by the instrument source is that from the desired sensor. Conversely it is important, for example, to know that a signal to initiate an actuation was received by the correct piece of equipment. For this reason, the operation of the invention will be described relative to such use, using a thermocouple system as an example. Thus, it is assumed for this description that there is a thermocouple attached as a "load" 14 on each lead pair 16A, 16B, 16C, etc. Each of these thermocouples generate a voltage related to its temperature that is conveyed over the lead pairs to a recording instrument 12. Typically, each lead pair is sequentially connected to the instrument using a multiplexer such as that indicated at 20 or by other suitable switching mechanisms.

In the present invention, as intended for this usage, a signal of a selected frequency is generated at the unit 18 which becomes a carrier signal for initiating operation of the specific identifier unit upon command. Depending upon the specific signal levels and type of sensor, the selected frequency can be any value from zero (DC) up to several hundred kilohertz (e.g., 500). This carrier signal is directed by the multiplexer 20 to a particular lead pair (eg., 16A) and thence to the identifier unit 26. As stated above, a portion of the carrier signal is converted to an appropriate operating voltage in the identifier unit 26 which is used to modify the impedance of the lines and modulate the carrier signal. This modulated carrier appears on the lead pairs so as to be monitored by the receiver-controller 24. This modification can be made to produce amplitude modulation, frequency modulation or phase modulation.

Figure 2:
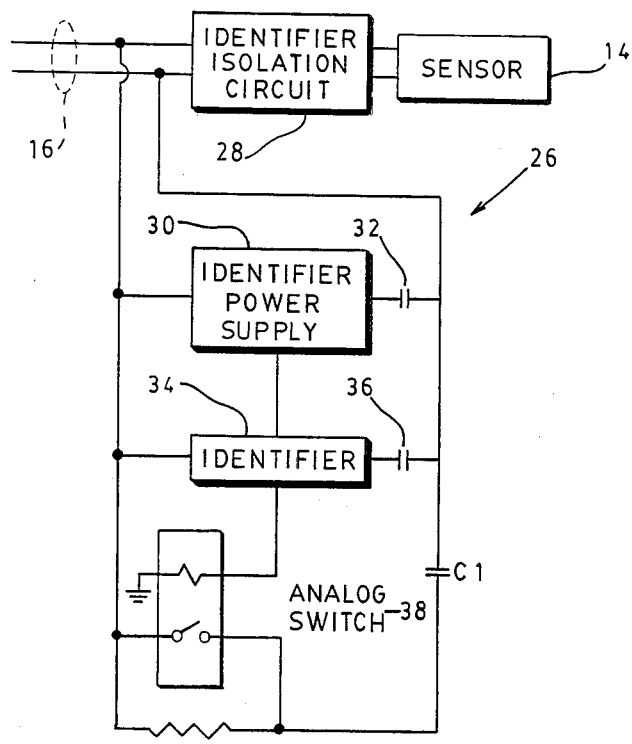
FIG. 2 is a block drawing of one embodiment of a sensor identifier unit.
Figure 3:
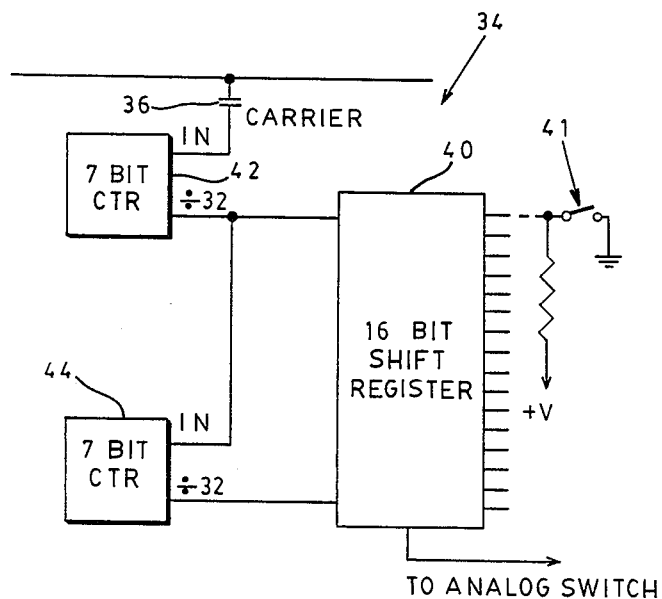
FIG. 3 is a solid state logic block diagram of the identifier of FIG. 2.
Figure 4:
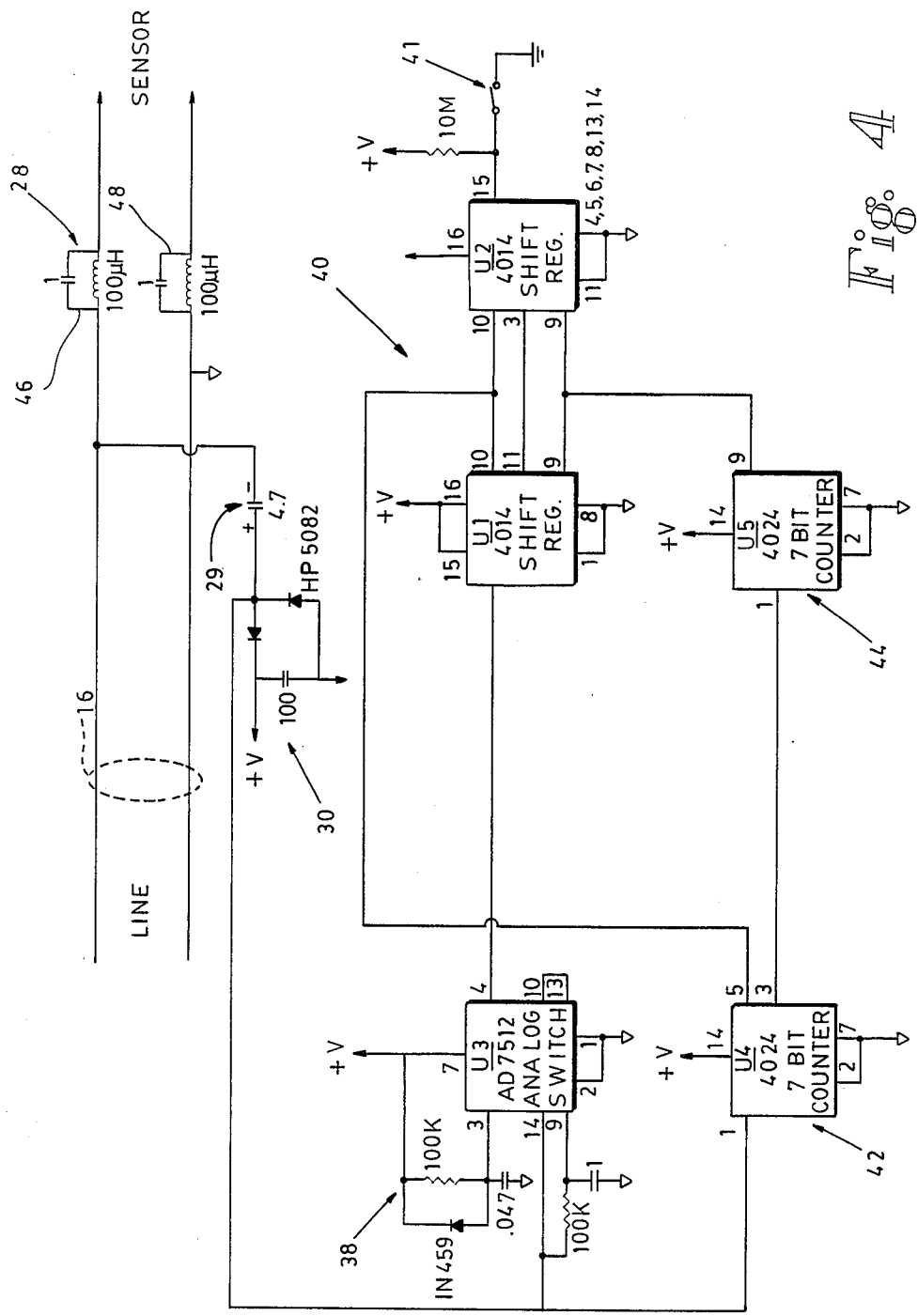
FIG. 4 is a schematic diagram of the identifier unit of FIGS. 1 and 2.

Greater detail of the identifier unit 26 is shown in FIGS. 2 through 4. Referring first to FIG. 2, a power supply 30 used to convert the carrier signal into a DC operating voltage is connected across the leads 16. A capacitor 32 (part of isolation unit 29) is used to prevent DC flow of the voltage generated from the sensor 14 in response to temperature. This prevents the identifier from affecting the sensor measurement. The voltage produced by the power supply is used to power the identifier circuit 34 that modulates the carrier to produce a digital code, which output is unique to that particular sensor. This identifier circuit is also capacitively coupled to the leads with a capacitor 36 (part of isolation unit 29). An analog switch 38 utilizes the output of the identifier circuit in digital format to change the effective impedance of the lines and thus cause a modulation of the carrier on the leads 16 such that the receiver at the opposite ends of the leads "credits" the information from the sensor 14 to the proper sensor.

FIG. 3 illustrates a particular construction of the identifier circuit 34 of FIG. 2 when amplitude modulation is to be utilized. The voltage, V, from the power supply 30 is applied to a programmed sixteen bit register 40, for example, and to the counters 42, 44. the output feeds the analog switch whereby a serial "word" is sent back to the receiver via the modulated carrier. The first bit of the serial word is "high", and is used as a timing set-up bit for the receiver. The second bit is "low" and is used to indicate the start of transmission of the identifying information. The other fourteen bits of information are used to determine what kind of sensor is being used and to identify the specific sensor that is responding. After the sixteen bits are transmitted, transmission shift registers 42, 44 are "held off" and reloaded with serial information for the same length of time as taken for the serial word transmission.

In the embodiment illustrated in this FIG. 3 (and FIG. 4), a "dip switch" 41 is utilized to permit setting any code into the identifier. This is particularly useful during testing of a system. Alternatively, an identifier can have a preset code, or the code can be programmed into the identifier using appropriate signals during installation of an identifier unit. It is within the scope of the invention, also, to achieve programing of an identifier with signals transmitted over the lines 16.

A schematic diagram of the identifier unit is shown in FIG. 4. Each of the components are illustrated as integrated circuits, and the components are identified by the numerals used in FIGS. 2 and 3. As indicated, a typical isolation unit 28 is provided with L-C tank circuits 46, 48 in each of the leads of the pair 16. Typical components and typical circuit element values are indicated. The isolation unit 29 is a capacitor for this application. It will be understood by persons versed in the art that components performing the same functions can be substituted for those shown in FIG. 4.

Figure 5:
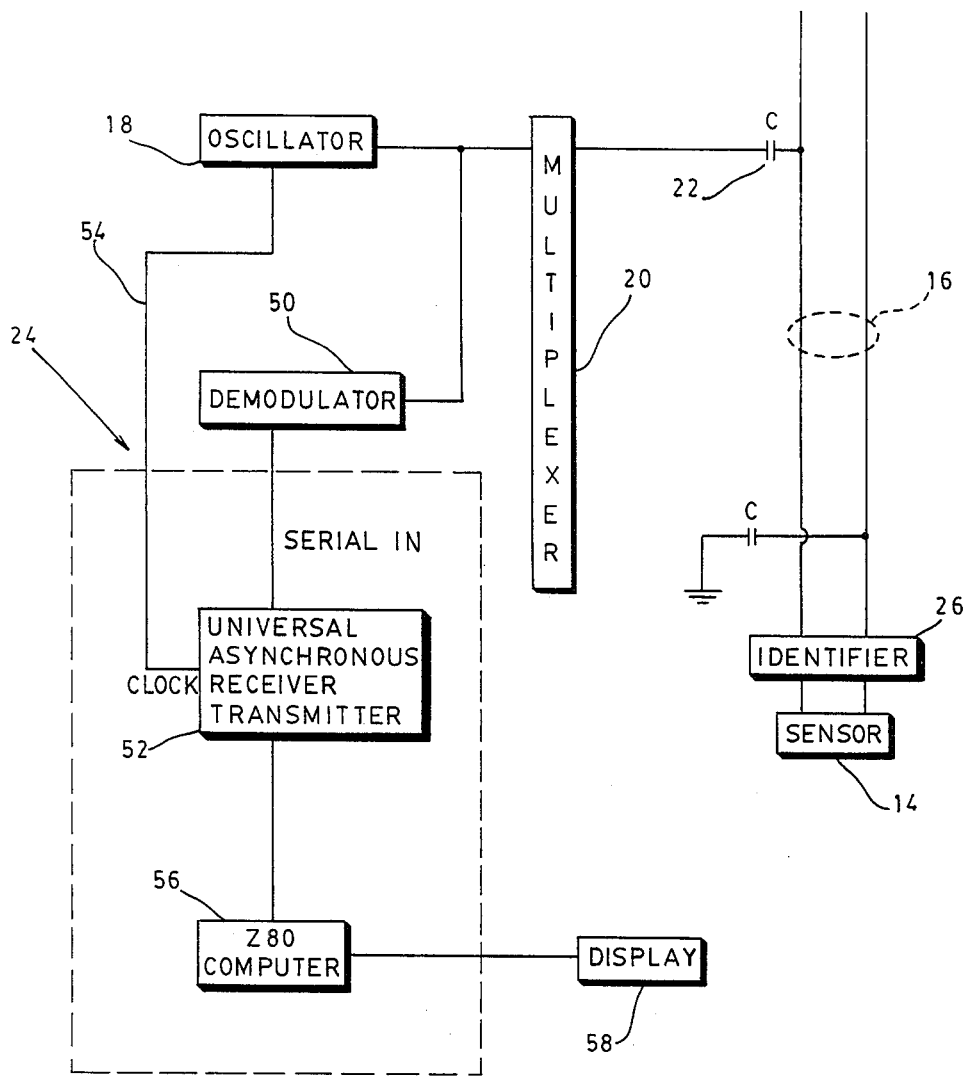
FIG. 5 is a block diagram of an identifier interface for the present invention.

The receiver-controller 24 shown generally in FIG. 1 is shown in greater detail in FIG. 5. More specifically, the circuit components illustrated therein are referred to as an identifier interface as it also includes the oscillator 18. These units are typical of those useful for carrying out the invention, however, persons skilled in the art will recognize that units performing the same function can be substituted in the circuit. As stated, the oscillator 18 generates a carrier excitation voltage which passes through the multiplexer 20 and the isolation unit 22 to leads 16. Demodulation of the serial word appearing on the leads, as produced by the identifier 26, is accomplished in a demodulation unit 50 by receiving the carrier in a half-wave rectifier unit, and low-pass filtering the rectified signal (See FIG. 6). Also within the demodulator is a voltage comparator where the signals are converted to TTL (transistor-to-transistor logic) voltage logic levels.

The serial information in TTL format is entered into a universal asynchronous receiver transmitter 52. A timing or clock signal is derived for this unit from the oscillator via lead 54. The serial word is decoded to determine the specific sensor being identified. Three successive "readings" of the serial word are used; if all agree, the serial word is deemed to be valid. If no start bit is received from the identifier unit 26 at the sensor 14 within a time set by a computer 56, the sensor wire pair is assumed to be defective and a display 58 indicates that there is no line. If, however, there is a valid serial word, the decoded information is displayed.

A schematic diagram of the elements generally shown in FIG. 5 is illustrated in FIG. 6. The particular integrated circuits and circuit elements are typical for accomplishing the desired result. It will be recognized by persons skilled in the art that other specific units and values that accomplish this result can be substituted.

As stated above, the circuit components illustrated in FIGS. 4 and 6 are specific for amplitude modulation of the carrier signal. For such, the analog switch 38 effectively lowers or raises the impedance of the line 16 in an equivalent circuit, as controlled by the identifier circuit, such that the generator impedance and the line impedance remain in a bridge circuit to modify the carrier signal during specific intervals of time, those intervals being unique to a particular identifier unit and sensor. It will be recognized by those skilled in the art that an identifier unit can be introduced into the circuit that will achieve either phase or frequency modulation, rather than amplitude modulation, for applications where such is preferred. The circuits for accomplishing the phase or frequency modulation are well known.

The principle of the present invention was demonstrated relative to lines connected to a thermocouple using the circuits illustrated in FIGS. 4 and 6. A carrier frequency of ten (10) kilohertz was utilized, with an output voltage of fifteen (15) volts peak-to-peak. It will be recognized that other choices of frequency and amplitude can be made for other applications; these were chosen for easy generation. Initial testing was with a one foot long line both "open ended" (no sensor) and shorted. It was found that the identifier responded with the proper identification under both conditions; similar results were obtained with a carrier of four (4) kilohertz.

Similar tests were carried out on a two hundred (200) foot line and a five thousand (5,000) foot line. In both lengths, the identifier unit modulated the excitation voltage correctly, and the decoder displayed the proper identification code. The identification code was varied by changing the position of the dip switch 41 and the identifier system correctly identified each new code. A test of the system at fifty (50) kilohertz was made; however, no amplitude modulation of the excitation voltage was observed. At one (1) kilohertz, the identifier operated normally. (The higher frequencies, however, are useful for phase modulation.)

The present identifier was connected into an existing thermocouple system. The particular system utilized a type K thermocouple, and the readout instrument (Doric Trendicator) had a 0.1 degree Fahrenheit resolution. The thermocouple system without the identifier registered 76.2 degrees F. in ambient air, and 36.3 degrees F. with the thermocouple in an ice-water bath. When the indicator system of the present invention was attached, a reading of 36.2 degrees F. was obtained; the difference is only equal to the resolution of the instrument. The identifier properly modulated the excitation voltage and displayed the correct identifier code. Some fluctuation was observed in the temperature signal during the identification process, but the reading returned to the correct value when identification was discontinued. The incorporation of tank (LC) circuits between the decoder connection to the line and the thermocouples instrumentation will eliminate these fluctuations. These results were obtained using lines of one (1), seventy-five (75) and one hundred fifty (150) feet.

From the foregoing, it will be understood by one skilled in the art that a method and an apparatus have been developed for the proper identification of an unknown "load" at one end of a line pair can be determined at the driving end without seriously affecting a load device. Although an embodiment for amplitude modulation for identification of a sensor such as a thermocouple has been described in detail, such embodiment is not given as a limitation of the present invention. Rather, the present invention is to be limited only by the appended claims and their equivalents when read in combination with the detailed description and the drawings.

We claim:

1. An interrogator system for determining the identity of an electrical load device attached to electrical lead wires for connecting a source unit to such load device, such lead wires for carrying signals between such source unit and such load device, which comprises:

an identifier unit positioned proximate such load device and connected to such lead wires, said identifier unit including a power supply for converting a portion of a carrier signal impressed upon such lead wires into a voltage, and an identifier circuit powered by said voltage and coupled to such lead wires for modulating said carrier signal in a manner uniquely related to such load device;

a signal generator connected to such lead wires proximate such source unit for producing said carrier signal having a selected frequency; and a receiver circuit connected to such lead wires proximate such source unit for receiving and demodulating said modulated carrier signal and for displaying/recording information as to said identity of such load device.

2. The system of claim 1 further comprising means for selectively connecting such source unit, said signal generator and said receiver circuit to one of a plurality of such load devices through such lead wires, each of such load devices being provided with said identifier unit.

3. The system of claim 1 further comprising isolating means at said load device to prevent application of said carrier signal to such load device, and further isolation means to prevent application of such signal carried between such source unit and such load device upon said identifier unit, said signal generator and said receiver circuit.

4. The system of claim 1 wherein said identifier circuit effects modulation of said carrier signal by effecting a change in circuit impedance in a manner unique to said identifier unit.

5. The system of claim 4 wherein said modulation is frequency modulation.

6. The system of claim 4 wherein said modulation is amplitude modulation.

7. The system of claim 4 wherein said modulation is phase modulation.

8. An interrogator system for attachment to a plurality of paired lead wires, each pair of lead wires having first ends connected to a source unit and further ends connected to a load device for carrying signals therebetween, said interrogator providing information to specifically determine the identity of said load device, which comprises:

an identifier unit positioned proximate each of said load devices and connected to said lead wires, said identifier unit including a power supply for converting a portion of a carrier signal selectively impressed upon each pair of lead wires into a voltae and an identifier circuit powered by said voltage and coupled to said lead wires, said identifier circuit causing modulation of said carrier signal in a manner uniquely related to said identifier unit and thereby to said load device; and a controller/receiver unit positioned proximate and connected to said first ends of said lead wires, said controller/receiver unit including a signal generator for producing said carrier signal to be selectively impressed upon said lead wires, a demodulator for receiving said modulate carrier signal, and a display/recorder connected to said demodulator for displaying/recording information as to the identity of said load device proximate said identifier unit.

9. The system of claim 8 further comprising means for selectively connecting said controller/receiver unit to one of said plurality of paired lead wires for interrogating a selected pair of lead wires as to said load device at said further end.

10. The system of claim 8 further comprising isolation means to isolate said carrier signal from said source unit and said load device, and to separate said signals carried between said source unit and said load device from said identifier unit and said controller/receiver unit.

11. The system of claim 8 wherein said identifier circuit is programmed during installation for modulating said carrier signal in a manner uniquely related to an associated load device.

12. The system of claim 8 wherein said load device is a thermocouple unit for producing a signal related to temperature and said source unit is a monitor of said signal of said thermocouple.

13. The system of claim 8 wherein said carrier signal has a selected frequency in a range of direct current to about 500 kilohertz.

14. The system of claim 8 wherein said identifier circuit modifies the circuit impedance of said load device to achieve said modulation of said carrier signal.

15. The system of claim 14 wherein said modulation of said carrier signal is amplitude modulation.

16. The system of claim 14 wherein said modulation of said carrier signal is phase modulation.

17. The system of claim 14 wherein said modulation of said carrier signal is frequency modulation.

18. The system of claim 9 wherein said controller/receiver unit further comprises a programmable signal processing unit programmed to sequentially connect said controller/receiver to each of said plurality of lead wire pairs and to display and record information as to said load device attached to said further ends of said lead wires to produce a wiring diagram of said wires and said load devices.

19. A passive interrogator system for uniquely determining the identity of an electrical load device attached to a first end of a pair of electrical lead wires, said lead wires having second ends for connecting to a source unit, said lead wires for carrying signals between said source unit and said load device, which comprises:

a signal generator connected to said lead wires for producing a carrier signal of a selected frequency on said wires;

an identifier unit positioned proximate said load device and connected to said lead wires, said identifier unit including a power supply for converting a portion of said carrier signal into a voltage, and a uniquely coded identifier circuit powered by said voltage, said coded identifier circuit uniquely modulating said carrier signal according to said code;

a receiver circuit connected to said lead wires for receiving and demodulating said modulated carrier signal and for displaying/recording information as to said identity of said load device.

20. The system of claim 19 wherein said uniquely coded identifier circuit effects modulation of said carrier signal by effecting a change in circuit impedance in a manner unique to said load device according to the unique code of said coded identifier circuit.

* * * * *